United States Patent

[11] 3,589,534

[72] Inventor Elmer L. Brown
        Rte 1, Box 130, Toledo, Wash.
[21] Appl. No. 808,751
[22] Filed Mar. 20, 1969
[45] Patented June 29, 1971

[54] BALE ELEVATOR AND LOADER
    12 Claims, 6 Drawing Figs.
[52] U.S. Cl. .................................................. 214/8.5 A,
                            198/28, 214/8.5 F, 198/155
[51] Int. Cl. ................................................... B65g 59/06
[50] Field of Search ........................................ 214/8.5 A,
        8.5 G, 8.5 F, 8.5 SS; 198/155, 7 BL, 28, 123, 226,
                                                            154

[56]            References Cited
            UNITED STATES PATENTS
1,112,947  10/1914  Turnbull ....................... 198/123

| | | | |
|---|---|---|---|
| 1,193,118 | 8/1916 | Buck ............................ | 198/28 |
| 3,327,872 | 6/1967 | Madden ....................... | 214/8.5 (A) |
| 3,415,353 | 12/1968 | Oertle .......................... | 198/156 |

FOREIGN PATENTS 191,067  10/1907  Germany ...................... 198/226

Primary Examiner—Gerald M. Forlenza
Assistant Examiner—George F. Abraham
Attorney—Buckhorn, Blore, Klarquist and Sparkman ABSTRACT: A loader having both sides hinged for stacking bales in its hopper has a pusher driven by a reversible screw drive which is stopped when a bale is positioned in a loading position of an elevator. The elevator then lifts the bale and raises it until an inclined deflector pushes the bale off onto a horizontal conveyor.

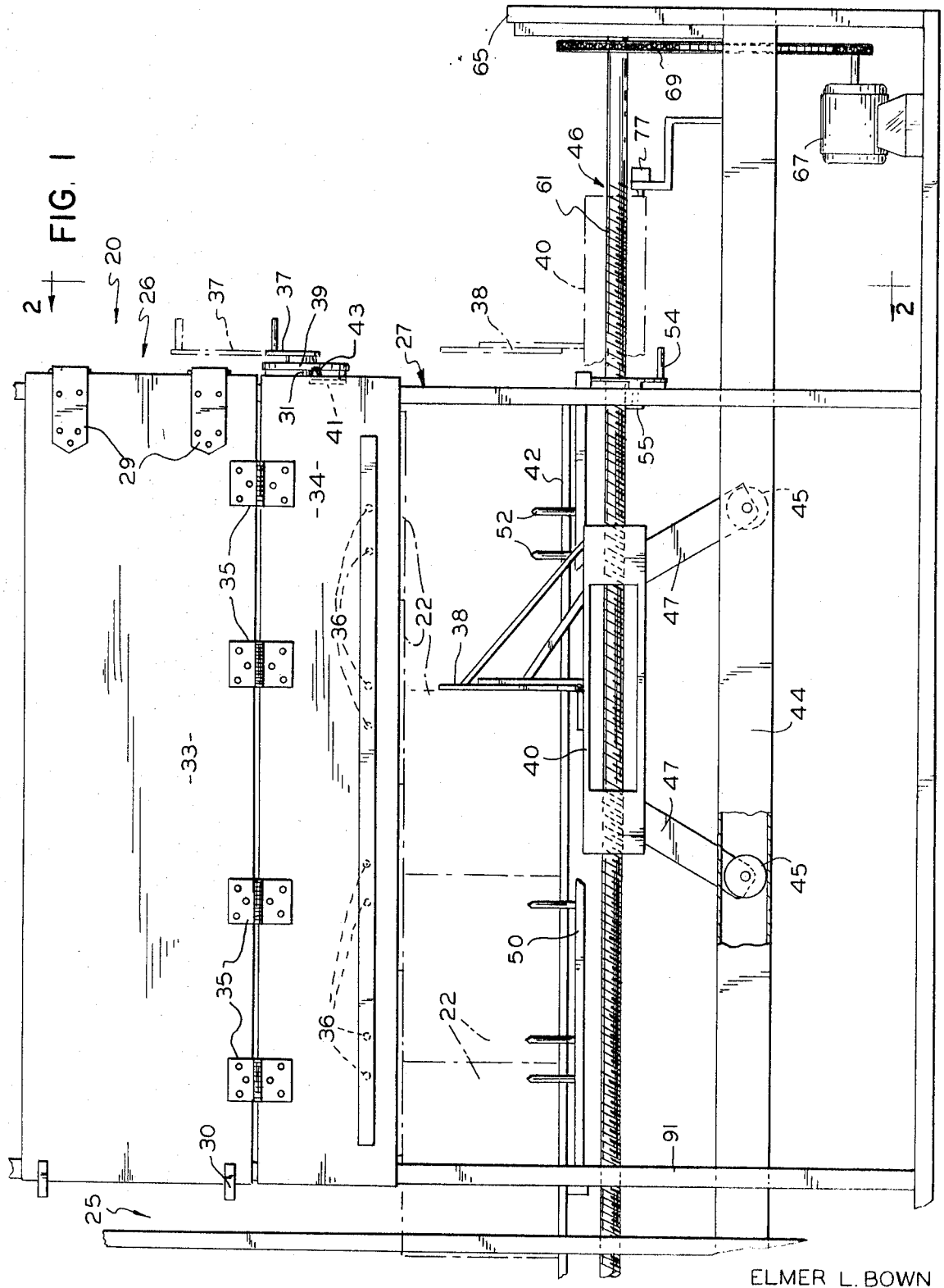

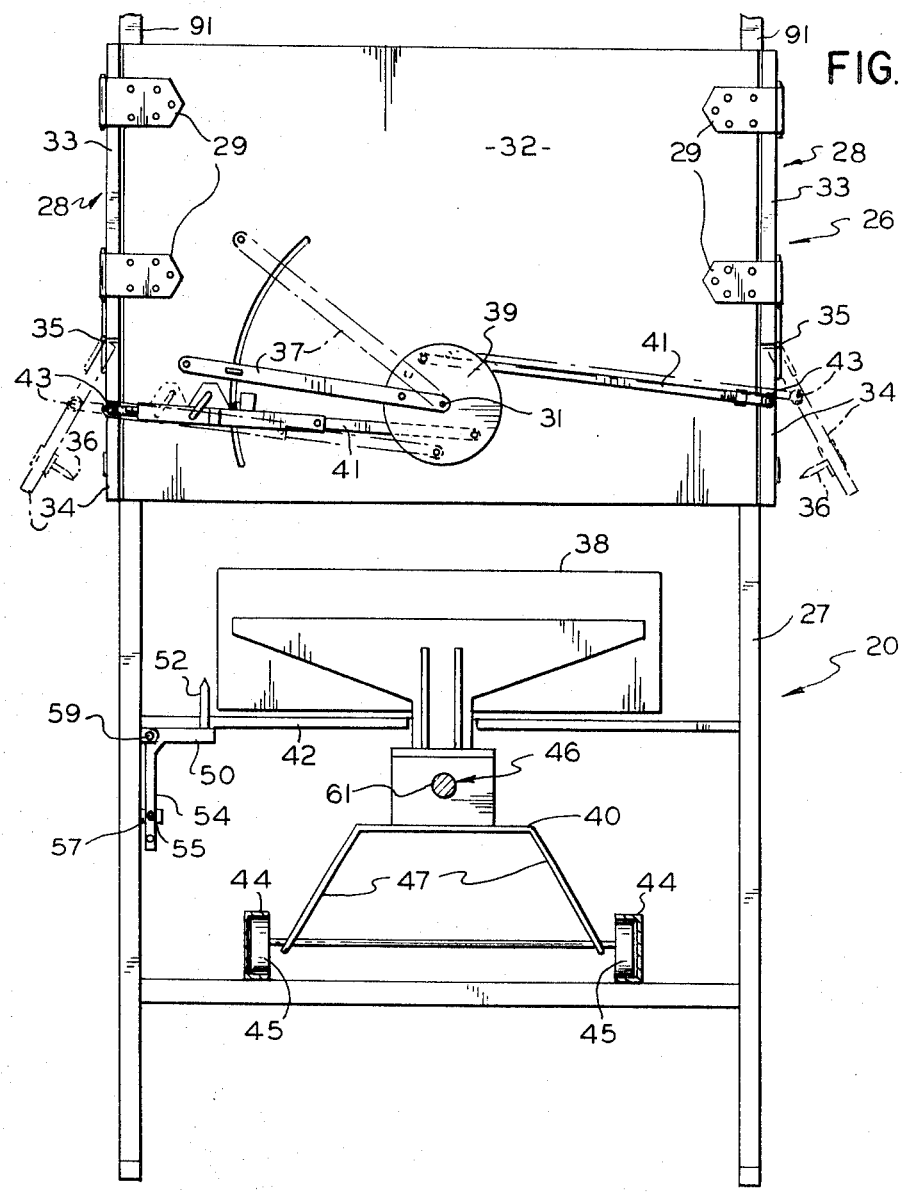
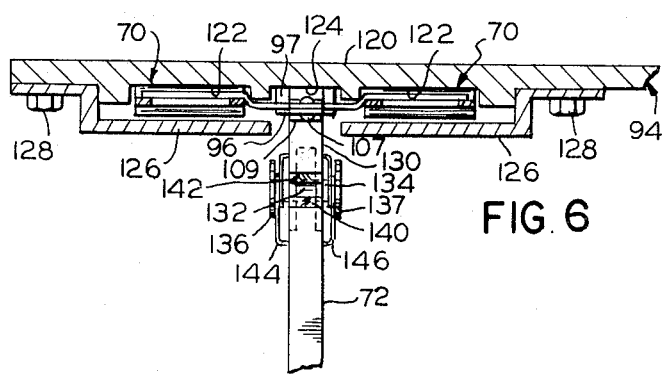

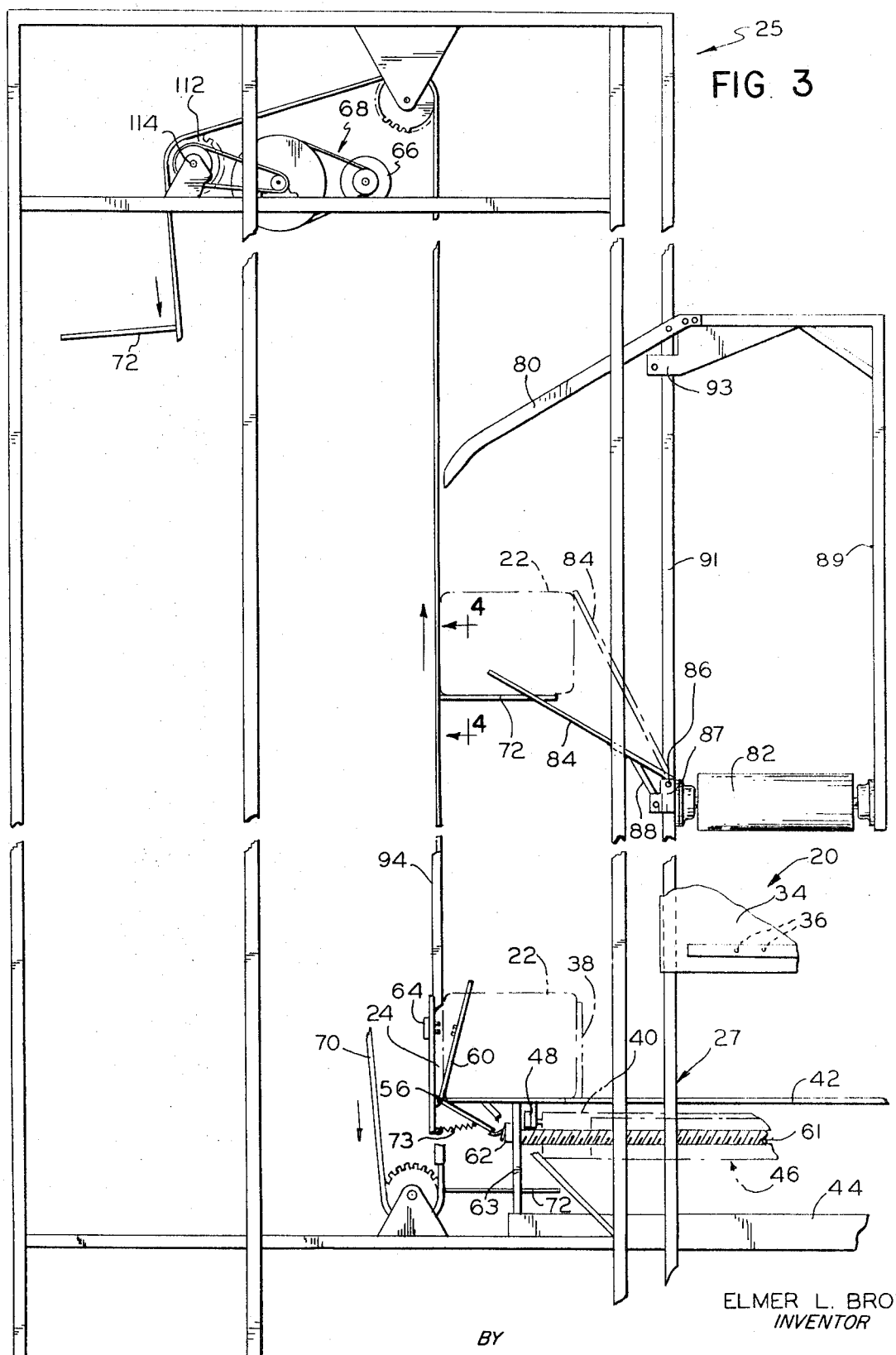

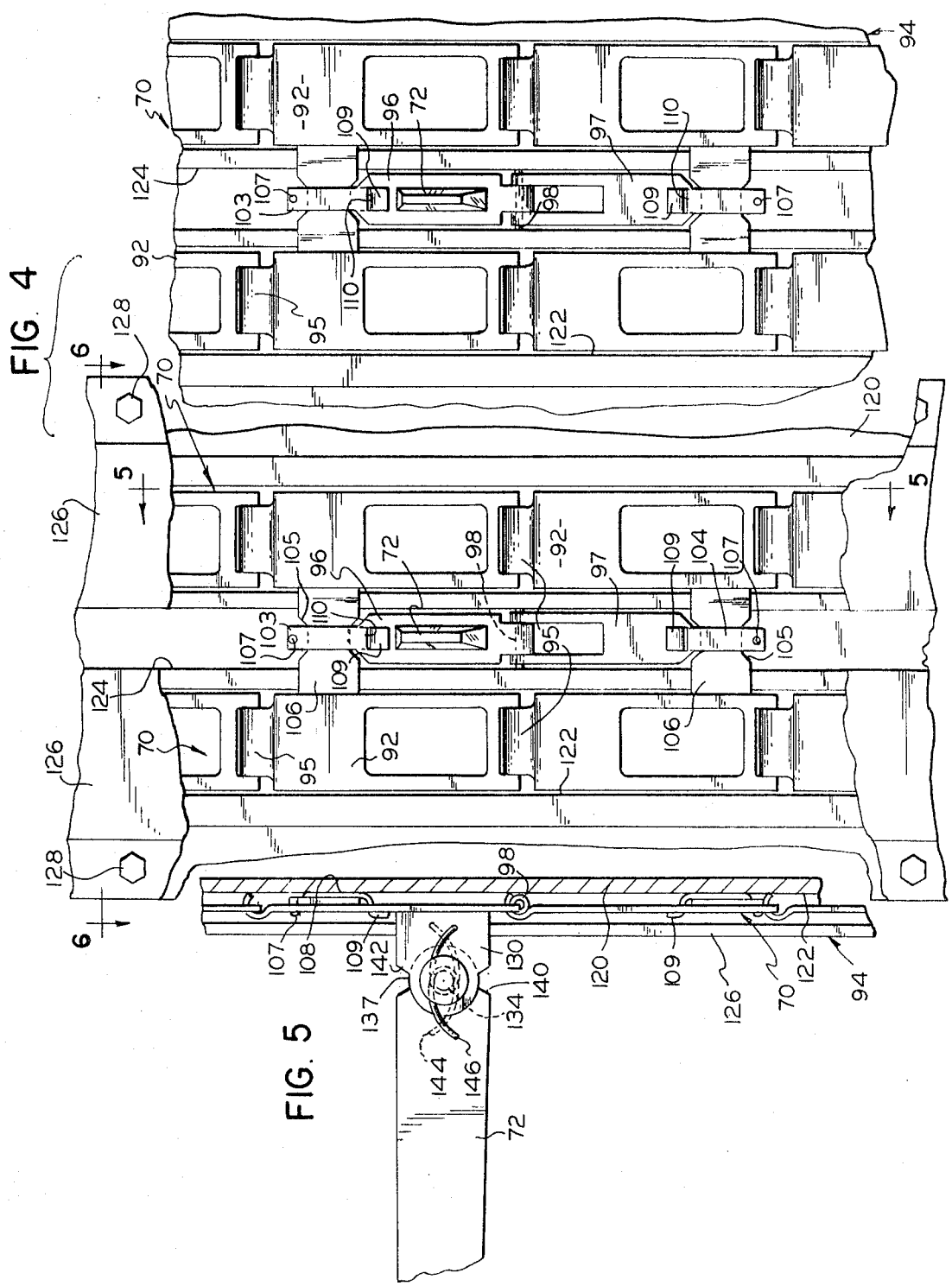

BALE ELEVATOR AND LOADER

This invention relates to a bale-handling elevator apparatus, and more particularly to a semiautomatically loaded elevator construction for elevating and automatically discharging bales.

An object of the invention is to provide a new and improved bale-handling elevator apparatus.

Another object of the invention is to provide a semiautomatically loaded elevator apparatus for elevating and automatically discharging bales.

Another object of the invention is to provide an elevator loader which can be supplied from either side.

A further object of the invention is to provide a loader which moves a bale to a loading station of an elevator and is stopped automatically.

Another object of the invention is to provide an elevator which has fixed deflectors for moving a bale off carry bars of the elevator.

Another object of the invention is to provide improved bale-carrying chains having ratchetlike tines.

Another object of the invention is to provide a bale elevator apparatus having bale-operated controls.

Another object of the invention is to provide a loader adapted to feed the bottom row of bales from a stack of bales.

The invention provides a bale-handling elevator apparatus including a loader for moving a bale to a loading position, an elevator for lifting the bale from the loading position to a discharge position. Preferably the loader includes a pusher driven by a reversible screw drive to push a bottom layer of bales out from under a stack of bales of which the layers above the bottom layer are held by tines. A detector at a loading station of the elevator starts an elevator chain and stops the reversible screw drive until a carry bar on the elevator moves the bale out of the loading station and then restarts the reversible screw drive. The carry bar carries the bale up to a deflector which pushes the bale off the carry bars to a horizontal conveyor. Preferably, the carry bar includes a pair of tines mounted pivotally on a pair of chains and biased to normal, horizontal bale-carrying positions and pivotal to inclined positions.

In the drawings:

FIG. 1 is a fragmentary, side elevation view of a loader of an elevator apparatus forming one embodiment of the invention;

FIG. 2 is a vertical sectional view taken along line 2-2 of FIG. 1;

FIG. 3 is a fragmentary, side elevation view of an elevator of the elevator apparatus of FIG. 1;

FIG. 4 is an enlarged, fragmentary, vertical sectional view taken along line 4-4 of FIG. 3;

FIG. 5 is an enlarged, fragmentary, vertical sectional view taken along line 5-5 of FIG. 4; and FIG. 6 is an enlarged, fragmentary, horizontal sectional view taken along line 6-6 of FIG. 4.

Referring now in detail to the drawings, there is shown therein an elevator apparatus forming one embodiment of the invention and including a semiautomatic loader 20 (FIGS. 1 and 2), which moves each bale 22 in a bottom layer of a stack to a loading station 24 where the bale is picked up by an elevator 25. The loader includes a skeletal frame 27 and a hopper 26 having two sides 28 mounted on the frame by hinges 29 and normally held closed by latches 30 (FIG. 1). Either side 28 may be unlatched and swung open for stacking the bales in the hopper in a stack including several layers of the bales. Each side 28 includes an upper plate 33 and a holding plate hinged thereto by hinges 35 and carrying impaling pins 36 which serve to hold the upper layers of the bales 22 from dropping while the lowermost layer of bales is pushed one bale width at a time by the pusher 38 on a carriage 40 along a slotted bottom 42 of the loader to a loading station 49. The plates 34 may be swung from their normal, vertical positions shown in full lines in FIG. 2 to releasing positions shown in broken lines in FIG. 2 by manually moving a lever 37 from a latched, holding position shown in full lines in FIG. 2 to a releasing position shown in broken lines in FIG. 2. The lever 37 is pinned or keyed to a crank disc 39 rotatably mounted on a pin 31 on an end plate 32 fixed to the frame 27 and forming one end of the hopper. Links 41 are pivotally connected to the crank disc and are connected by universal joints 43 to the plates 34 for moving the plates 34 between the full line and broken line positions shown in FIG. 2 and for permitting the plates 34 to be swung with the plates 33 relative to the frame 27 when the plates 33 are unlatched from the frame and are swung open to permit loading of the stack of bales in the hopper.

A plate 50 (FIGS. 1 and 2) carrying tines 52 is movable manually by a handle 54 between the bale-holding position shown and a releasing position in which the tines 52 have been pulled downwardly and are out of the bales of the lower layer. When the plate 50 is in its bale-holding position, the handle 54 engages a stop switch 55 to stop the screw drive 46. The plate 50 is pivoted by aligned pins 59 to the frame 27, and a latch 57 normally holds the plate 50 in its bale-holding position.

The carriage 40 has wheels 45 on legs 47, and is moved along opposed channels 44 forming a track by a reversible screw drive 46 (FIG. 3), which is stopped when the carriage engages a limit switch 48 as the pusher pushes the last of the bales of the lower layer to the loading station 24. The drive 46 includes a screw 61 FIGS. 1 to 3) journaled in radial-and-thrust bearings carried by upright frame members 63 and 65 of the frame 27, and also includes a reversible electric motor 67 (FIG. 1) connected to the screw by a chain and sprocket drive 69. A rigid, L-shaped switch actuator 60 is mounted pivotally on a member 56 of the frame 27. When one of the bales 22 arrives at the loading station 24, it moves the switch actuator 60 to open a switch 62 to the motor 67 of the screw drive 46 and closes switch 64 to a motor 66 of a vertical elevator drive 68. Pairs of elevator chains 70 then are driven to move carry bars 72 upwardly through the loading station to pick up the bale and elevate it. As this bale clears the loading station, it releases the actuator 60 which is then moved by a spring 73 away from the switches 62 and 64 to start the screw drive 46 to push another bale to the loading station and to stop the vertical elevator until this latter bale is in the loading station ready to be picked up. When the last of the lower layer of bales is moved to the loading station, the carriage 40 actuates the switch 48 which sets up a holding circuit to reverse the drive 46 to return the carriage to its starting position shown in broken lines in FIG. 1, at which time the carriage actuates a switch 77 to stop the drive 46 and set it up for drive in the bale-feeding direction. The operator then turns the crank disc 39 to release the stack and let it drop onto the plate 42, and then swings the crank back to its position holding the plates 34 in their holding positions. The operator then actuates a switch to start the drive 46 and the lowermost layer of bales is fed one at a time to the loading station 24.

As each bale 20 on the elevator is raised to the upper portion of the elevator 25, the bale is moved against parallel, fixed deflectors 80 (FIG. 1), which push the bale off the tine type carry bars 72 onto a vertically adjustable horizontal belt conveyor 82. Inclined guide bars 84 guide each bale to the horizontal elevator. The guide bars 84 are mounted by hinges 86 on clamp 87 of conveyor frame 89 and may be swung up from stops 88 by each bale being raised, the guide bars dropping back down under the bale before the bale is pushed off the carry bars 72 by the deflectors 80. The belt conveyor 82 is carried on the rigid frame 89, which is adjustable along a pair of posts 91 of the frame 27. The frame 89 is carried by the clamps 87 and clamps 93, which releasably clamp the posts 91 and are adjustable along the posts after being loosened.

There are two carry bars 72 (FIGS. 3 to 6) at each level and carried by two pairs of conveyor chains 90 having links 92 hinged at 95 and supported by rigid guide tracks 94 which prevent links 96 and 97 carrying the carry bars from buckling in the elevating course to keep the carry bars horizontal. The links 96 and 97 are pivotally connected to each other by pins 98, and have forked end portions 103 and 104, respectively, which bracket necked down portions 105 of bars 106 welded to adjacent links 92. The pins 98 are aligned with the pivot connecting portions 95 at each end of the pins 98. Capscrews or rivets 107 secure the outer ends of the forked end portion 103 and 104 together. The forked end portions are defined by the necked down ends of the links 96 and 97 and by locking plates 108 having hooked connecting portions 109 passing through slots 110 in the links 96 and 97. The chains 70 are driven by sprockets 112 (FIG. 3) keyed to driven shaft 114 in positions always maintaining the pivot points of the four chains in alignment with each other and with the pins 98 (FIG. 4) of one pair of the chains 70 in alignment with the pins 98 of the other pair of chains, the carry bars 72 of one pair of the chains 70 being laterally aligned with the carry bars of the other pair of chains 70.

The guide 94 (FIGS. 3 to 6) includes a rigid, vertical plate 120 having grooves 122 guiding the chains 70 and grooves 124 for guiding the links 96 and 97. Retaining plates or covers 126 secured to the plate 120 by capscrews 128 keep the chains 70 from tilting or buckling from load on the carry bars 72 to keep the bars 72 in horizontal positions as the bar 72 lift the bales.

Each carry bar 72 (FIGS. 5 and 6) is carried by a fork 130 rigidly secured to one of the links 96. The bar 72 has a rounded or circular end portion 132 fitting into the fork and a rivet 134 having heads 136 and 137 extends through holes in the end portion 132 and the arms of the fork to mount the bar 72 pivotally on a horizontal axis, the bar 72 having relieved portions 140 and the arms of the fork having relieved portions 142 to permit limited pivotal movement of the bar relative to the fork. Strong torsion springs 144 and 146 bias the carry bars 72 toward normal positions preferably tilted slightly upwardly proceeding away from the forks. When the carry bar is supporting one half of one of the bales 22, the carry bar is substantially horizontal. When the bale is pushed upwardly against the deflector 80 (FIG. 3), the added downward force tilts the carry bars downwardly somewhat to aid in sliding the bale off the carry bars and on the guide bars 84 and belt conveyor 82.

I claim:

1. In combination,
a loading station,
a loader for moving a bale to the loading station,
an elevator including a plurality of carry bars for lifting a bale at the loading station and elevating the bale,
and discharge means for pushing the bale off the carry bars when the bale has been lifted to a predetermined level,
the discharge means including a deflector extending angularly to and in the path of the bale for wedging the bale off the carry bars as the carry bars push the bale against the deflector,
the carry bars including tines, means mounting the tines pivotally between horizontal positions and downwardly inclined positions and means biasing the carry bars toward the horizontal positions thereof and permitting movement of the carry bars to the downwardly inclined positions thereof.

2. The combination of claim 1 including fixed frame means, discharge conveyor means,
and means mounting the conveyor means vertically adjustably on the fixed frame.

3. The combination of claim 2 wherein the fixed frame means includes a plurality of posts,
the mounting means including a conveyor frame including clamps releasably clamping the posts and movable along the posts when in a released condition.

4. In combination,
a loading station,
a loader for moving a bale to the loading station,
an elevator including a plurality of carry bars for lifting a bale at the loading station and elevating the bale,
discharge means for pushing the bale off the carry bars when the bale has been lifted to a predetermined level,
fixed frame means,
discharge conveyor means,
means mounting the conveyor means vertically adjustably on the fixed frame means,
the fixed frame means including a plurality of posts,
the mounting means including a conveyor frame including clamps releasably clamping the posts and movable along the posts when in a released condition,
and a supporting slide carried by the conveyor frame below the deflector.

5. The combination of claim 4 wherein the supporting slide is pivotal by the bale between a lower inclined position and an upper position permitting the bale to move upwardly therepast, and means biasing the slide toward the lower position thereof.

6. In combination;
a loading station,
a loader for moving a bale to the loading station,
an elevator including a plurality of carry bars for lifting a bale at the loading station and elevating the bale,
discharge means for pushing the bale off the carry bars when the bale has been lifted to a predetermined level,
the loader including a hopper supporting a stack of horizontal layers of bales, a bed positioned adjacent the lower end of said hopper, means on the bed for pushing a layer of bales thereon sidewise to advance the bales one at a time to the loading station and releasable impaling means at the lower end of said hopper including impaling pins for projecting into the end portions of the bales and supporting the bottom layer of bales above the bed.

7. The combination of claim 6 including hopper means having a first side pivotal to an open position for loading the hopper means and also having a second side pivotal to an open position for loading the hopper means.

8. The combination of claim 6 including hopper means having skirt portions carrying tines and pivotal between impaling and releasing positions.

9. In combination,
a loading station,
a loader for moving a bale to the loading station,
an elevator including a plurality of carry bars for lifting a bale at the loading station and elevating the bale,
discharge means for pushing the bale off the carry bars when the bale has been lifted to a predetermined level,
the loader including a bed adapted to support a layer of bales and means for pushing the bales along the bed to advance the bales one at a time to the loading station,
and detector means at the loading station responsive to a bale at the loading station for actuating the elevator and stopping the loader.

10. The combination of claim 9 wherein the detector means includes a pivotal member in the path of the bale and control switch means responsive to movement of the pivotal member.

11. In combination,
a loading station,
a loader for moving a bale to the loading station,
an elevator including a plurality of carry bars for lifting a bale at the loading station and elevating the bale,
discharge means for pushing the bale off the carry bars when the bale has been lifted to a predetermined level,
fixed frame means,
discharge conveyor means,
and means mounting the conveyor means vertically adjustably on the fixed frame means,
the fixed frame means including a plurality of posts,
the mounting means including a conveyor frame including clamps releasably clamping the posts and movable along the posts when in a released condition,
the discharge means including a deflector carried by the conveyor frame.

12. In combination,
a loading station,
a loader for moving a bale to the loading station,
an elevator including a plurality of carry bars for lifting a bale at the loading station and elevating the bale,
discharge means for pushing the bale off the carry bars when the bale has been lifted to a predetermined level, the discharge means including a deflector extending angularly to and in the path of the bale for wedging the bale off the carry bars as the carry bars push the bale against the deflector, and a deflector slide mounted pivotally for movement by the bale from a lower, inclined position in the path of the bale to an upper, bale-clearing position and means biasing the slide toward the lower, inclined position thereof.